(12) United States Patent
Messerges et al.

(10) Patent No.: US 10,726,117 B2
(45) Date of Patent: Jul. 28, 2020

(54) METHOD TO RECOVER DATA FROM A LOCKED DEVICE FOR UPLOAD TO A SERVICE

(71) Applicant: MOTOROLA SOLUTIONS, INC, Chicago, IL (US)

(72) Inventors: Thomas S. Messerges, Schaumburg, IL (US); Katrin Reitsma, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 26 days.

(21) Appl. No.: 15/636,302

(22) Filed: Jun. 28, 2017

(65) Prior Publication Data

US 2019/0005223 A1 Jan. 3, 2019

(51) Int. Cl.
*G06F 21/34* (2013.01)
*H04L 29/06* (2006.01)
*G06F 21/35* (2013.01)
*G06F 21/62* (2013.01)
*H04L 9/08* (2006.01)
*H04W 12/06* (2009.01)

(52) U.S. Cl.
CPC .............. *G06F 21/34* (2013.01); *G06F 21/35* (2013.01); *G06F 21/6209* (2013.01); *H04L 9/0894* (2013.01); *H04L 63/08* (2013.01); *H04L 63/0428* (2013.01); *H04W 12/06* (2013.01)

(58) Field of Classification Search
CPC ...... G06F 21/34; G06F 21/6209; G06F 21/35; H04L 9/0894; H04L 63/08; H04L 63/0428; H04W 12/06; H04W 12/0608
See application file for complete search history.

(56) References Cited

U.S. PATENT DOCUMENTS

| | | | |
|---|---|---|---|
| 9,088,896 B2 | 7/2015 | Bravo et al. | |
| 9,202,035 B1* | 12/2015 | Manusov | G06F 21/32 |
| 2010/0058087 A1* | 3/2010 | Borras | G06F 1/3203 |
| | | | 713/322 |
| 2014/0040622 A1 | 2/2014 | Kendall et al. | |
| 2014/0093084 A1* | 4/2014 | De Atley | H04L 9/0861 |
| | | | 380/277 |
| 2014/0101451 A1 | 4/2014 | Chan et al. | |
| 2015/0121089 A1* | 4/2015 | Kirikova | G06F 21/6209 |
| | | | 713/193 |

(Continued)

FOREIGN PATENT DOCUMENTS

| | | | | |
|---|---|---|---|---|
| WO | 2008156848 A1 | 12/2008 | | |
| WO | WO-2008156848 A1 * | 12/2008 | ............. | G06F 21/34 |

OTHER PUBLICATIONS

Copkay: "[Guide] Full Phone Backup without Unlock or Root", xdadevelop forum, Dec. 31, 2011 (Dec. 31, 2011), XP055502238, Retrieved from the Internet: URL:https://forurn.xda-developers.com/galaxy-nexus/generali guide-phone-backup-unlock-root-t1420351 [retrieved on Aug. 24, 2018} (Year: 2011).*

(Continued)

*Primary Examiner* — Meng Li

(57) ABSTRACT

A method for recovering a digital file from a locked device is provided. An identity token is received at a recovery app on the locked device. The recovery app retrieves a digital file from the locked device and sends the digital file and the identity token to a service external to the device.

18 Claims, 2 Drawing Sheets

(56) References Cited

U.S. PATENT DOCUMENTS

2015/0269374 A1    9/2015  Fan et al.
2016/0066189 A1*   3/2016  Mahaffey .............. G06F 21/316
                                                   455/405
2018/0307514 A1*  10/2018  Koutyrine ........... G06F 9/45558

OTHER PUBLICATIONS

Copkay: "[Guide] Full Phone Backup without Unlock or Root", xdadevelop forum, Dec. 31, 2011 (Dec. 31, 2011), XP055502238, Retrieved from the Internet: URL:https://forum.xda-developers.com/galaxy-nexus/general/guide-phone-backup-unlock- root-t1420351 [retrieved on Aug. 24, 2018] p. 3, line 19 p. 3, lines 30-32 p. 4, line 5 p. 4, lines 24-25 p. 4, line 33 p. 6, line 1 p. 6- • figure 1.
Neha S Thakur: 11 Forensic Analysis of WhatsApp on Android Smartphones11 , University of New Orleans Theses and Dissertations, Aug. 6, 2013 (Aug. 6, 2013), XP055502477, Farmville Retrieved from the Internet: URL:https://pdfs.semanticscholar.org/44d6/ 2adc08e878499f775569385386590bf20032.pdf [retrieved on Aug. 27, 2018] the whole document.
The International Search Report and the Written Opinion, corresponding Serial No. PCT/US2018/036251 filed Jun. 6, 2018, all pages.

\* cited by examiner

METHOD TO RECOVER DATA FROM A LOCKED DEVICE FOR UPLOAD TO A SERVICE

BACKGROUND OF THE INVENTION

Society has become more and more dependent upon technology. As electronic devices have become increasingly ubiquitous, our dependence on them also increases.

Keeping our electronic devices secure is also extremely important. Many security techniques have been utilized. One of the most common security techniques is password protection. Passwords can be used to prevent access to an electronic device by unauthorized users.

One problem with passwords is that anyone who finds out the password of another user can use that password to access that person's device. For this reason, many hardware devices require users to change their passwords on a regular basis. One unfortunate downside to this required password changing is that users end up with so many different passwords for all of their various devices and programs that it is easy to forget a password.

In order to maintain privacy of users and to keep unauthorized people or agencies from viewing files or data on an electronic device, device manufacturers have made it extremely difficult for anyone to access an electronic device without the log in password. This leads to a serious issue in the case where the owner of the phone forgets the password or becomes incapacitated. This can be an even bigger problem when the user has important files or data on the electronic device and where the important files or data have not been backed up or transferred to the cloud.

Therefore, a need exists for a method of recovering files from a locked device when the owner of the device is unable to unlock the device.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
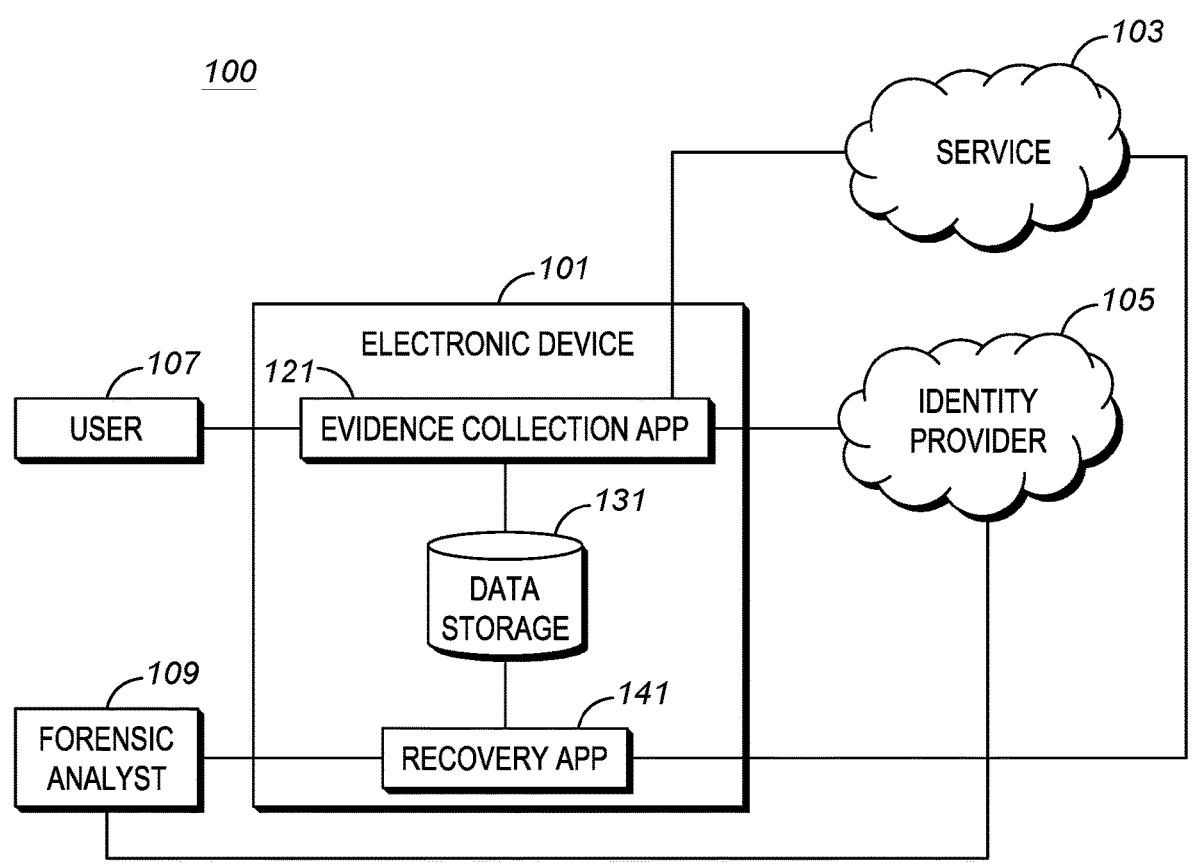
FIG. 1 depicts a block diagram of an electronic device in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An exemplary embodiment of the present invention provides a method for recovering a digital file from a locked device. In an exemplary embodiment, the locked electronic device starts in a powered off state and receives a command to power up. The device receives a data recovery command, for example from a forensic analyst, which includes a forensic analysis program or app. In accordance with an exemplary embodiment, the data recovery is able to be executed on the locked device when the locked device is rebooted without the need for the locked device to be unlocked. A recovery app on the locked device receives an identity token, such as a recovery identity token, that comprises an attribute that distinguishes the identity token as a forensics identity token. The identity token can be an identity token received via a camera on the locked device. In addition, the identity token may be a one-time use token. The recovery app retrieves a digital file from data storage on the locked device. The digital file may be an encrypted or non-encrypted data file. The recovery app sends the digital file and the identity token to a service, such as a microservice running in infrastructure equipment coupled with the electronic device.

FIG. 1 depicts a block diagram 100 of an electronic device 101, a Service 103, Identity Provider 105, a User 107, and a Forensic Analyst 109 in accordance with an exemplary embodiment of the present invention.

Electronic device 101 comprises Evidence Collection App 121, Data Storage 131, and Recovery App 141. Electronic device 101 can be, for example, a mobile device such as a cell phone utilizing the Android or iOS operating systems. Electronic device 101 can alternately comprise, for example, a land mobile radio, a body camera, or any other electronic device that is capable of storing data thereon.

In an exemplary embodiment, an identity token is used by Evidence Collection App 121 and Recovery App 141 to access Service 103 and is requested from Identity Provider 105. The identity token is a security code, such as a JavaScript Object Notation (JSON) Web Token, used to confirm a user's identity or role to allow and then to obtain access to a server or application. In some embodiments, the identity token includes additional attributes that identify it as a forensic identify token.

Evidence Collection App 121 is an application running on Electronic Device 101 that stores digital evidence, for example pictures of crime scenes.

Data Storage 131 is a digital storage medium. In accordance with an exemplary embodiment, Data Storage 131 stores digital evidence, such as digital pictures. In accordance with an exemplary embodiment, evidentiary data is collected by various apps on electronic device 101 and written into and read from data storage 131, preferably in an open-access/public folder. This differs from the prior art, where evidentiary data is written into and read from memory that is accessible to Evidence Collection App 121 only after the user has provided credentials to the device at boot up or for screen unlock.

In an exemplary embodiment, data is encrypted and/or signed prior to storing in data storage 131. In a first exemplary embodiment, data is encrypted with a disk encryption key that is available to apps and services running on the device without the user unlocking device 101, such as is achieved when the data is stored using Android's "Device Encrypted Storage" or when the data is assigned the iOS operating system's "no protection" data protection class of NSFileProtectionNone. This allows the data to be accessible by Recovery App 141 without the need for user 107 to unlock the locked device 101. In a second exemplary embodiment, data is encrypted with an application layer key, such as a key corresponding to a microservice. In the case of digital evidence, data collected on a device may be encrypted with a public or symmetric key corresponding to a vault microservice that is used to archive evidentiary data. The mobile device preferably encrypts the collected data based on this vault microservice key and the vault microservice preferably decrypts the data based on either a private key held exclusively by the vault microservice or the symmetric key, thereby making any digital evidence data stored on the device accessible to only the vault microservice.

To encrypt the data, various methods can be used. For example, there can be disk encryption and no file encryption. In this method, the files are encrypted with the disk encryption key. When the device is booted, the disk encryption key becomes available to processes running on the device and the data folder can be automatically decrypted when one of these processes needs to access the data, preferably without any user interaction. The decryption would therefore be a property of the operating system and not triggered by Recovery App 141. In this exemplary embodiment, the data is in a decrypted state prior to being uploaded to Service 103.

A second method for encrypting the data comprises disk encryption plus file encryption. In this method, the files are each encrypted with an encryption key from Service 103 and the entire app data directory is also encrypted as part of the disk encryption. The disk encryption key is available for use when the device is booted. In this method, when Recovery App 141 triggers uploading of the data, the data is encrypted prior to being uploaded to Service 103. Recovery App 141 would not need access to the encryption/decryption key since the data is sent to Service 103 in encrypted format.

A third method for encrypting the data comprises no disk encryption but instead uses file encryption. In this method, the data remains encrypted under the file encryption key when uploaded to Service 103.

A fourth method comprises no disk or file encryption for protecting the evidentiary data stored in data storage 131. In this method, the data is not disk or file encrypted prior to being uploaded to Service 103.

In all cases, especially without any disk or file encryption to protect the confidentiality and integrity of the data, it is preferable that the link between Recovery App 141 and Service 103 is a protected link, such as SSL, to provide secure transfer of the data.

In accordance with an exemplary embodiment, Data Storage 131 is accessible after booting up device 101 but prior to unlocking device 101. For devices utilizing the Android operating system, Android's "device encrypted storage" allows the digital file to be accessible by Recovery App 141 without the need for User 107 to unlock Device 101. For devices utilizing the iOS operating system, the digital files are assigned the "NSFileProtectionNone" attribute so that the digital file is accessible by Recovery App 141 without the need for User 107 to unlock Device 101.

Recovery App 141 is an application that executes software code. In an exemplary embodiment, Recovery App 141 runs before screen unlock on electronic device 101 is required. For example, in the case where electronic device 101 is running the Android operating system, electronic device 101 utilizes the Direct Boot feature. Registering components of the data recovery app to run in Android's Direct boot mode, allows data to be recovered from device 101 in the case where the password is lost or forgotten, when the user of device 101 is unable to be located or is incapacitated, a previously acquired identity token of user 107 is expired, or an automatic upload of an app has crashed.

Service 103 is preferably a microservice such as CommandCentral Vault sold by Motorola Solutions. Service 103 receives and stores evidentiary data from Recovery App 141 or Evidence Collection App 121. In an exemplary embodiment, Service 103 can determine whether data has been uploaded from Recovery App 141 or Evidence Collection App 121 by examining the identity token used when uploading the data.

Identity Provider 105 provides identity tokens to users once the users have been verified. A user sends an identifier, such as a login name, and a password or other authentication code to Identity Provider 105. Identity Provider 105, upon verifying the requestor, sends an identity token to the requesting user. The identity token can be a single use token, a multiple use token, or can be an identity token that expires on a predetermined date or after a predetermined amount of time.

User 107 is the person operating Electronic Device 101. User 107 is in control of access to Device 101, for example by setting the password required to unlock device 101 or by providing the biometric data required to unlock device 101.

Forensic Analyst 109 is a person, program, or app attempting to access data from electronic device 101. Forensic analyst is typically not the same as user 107. In accordance with an exemplary embodiment, forensic analyst 109 is retrieving data from electronic device 101 when forensic analyst 109 does not know the password or other criteria required to gain access to electronic device 101. In one exemplary embodiment, user 107 has forgotten the password and so cannot unlock device 101. In a further exemplary embodiment, user 107 is no longer available to unlock device 101, for example is injured or worse and cannot perform the functions required to unlock device 101.

Figure 2:
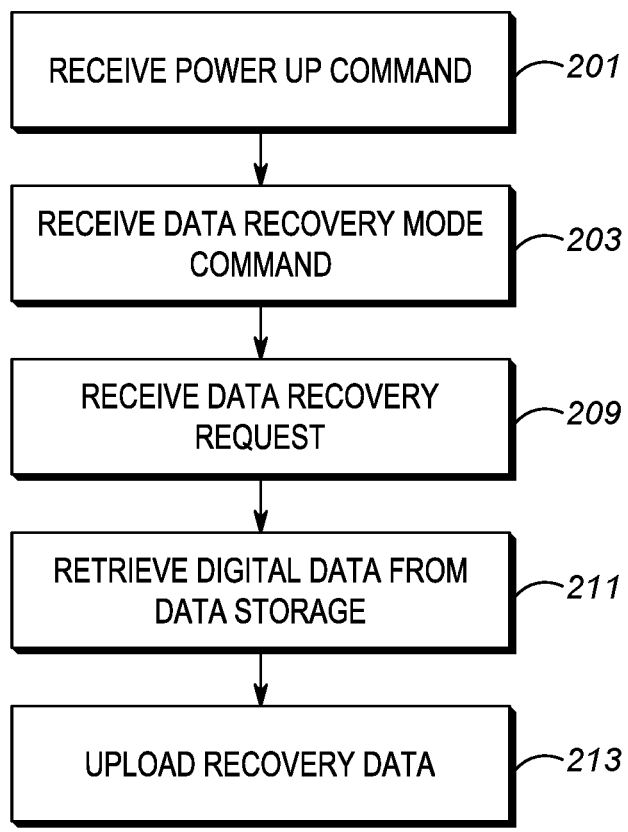
FIG. 2 depicts a flowchart of a method to recover data from a locked device for upload to a service in accordance with an exemplary embodiment of the present invention.

FIG. 2 depicts a flowchart 200 of a method to recover data from a locked device for upload to a service in accordance with an exemplary embodiment of the present invention. In the exemplary embodiment depicted in FIG. 2, Electronic Device 101 is powered down and Recovery App 141 is not running.

At some point prior to or during the steps of FIG. 2, Forensic Analyst 109 requests an identity token from Identity Provider 105. Forensic Analyst 109 receives an identity token from Identity Provider 105 and preferably uses this identity token during the steps comprised in FIG. 2. Forensic Analyst 109 can store the identity token in any acceptable manner, including but not limited to storing in portable memory or in memory on a device of Forensic Analyst 109. The identity token is preferably sent to Identity Provider 105 via any suitable means, such as over an Internet connection.

Electronic Device 101 receives (201) a power up command. In accordance with an exemplary embodiment, the powering up command of device 101 is received from forensic analyst 109 and device 101 begins execution of Recovery App 141, even before the entering of user credential information on device 101. A user credential entry screen preferably appears to prompt the user for authentication, such as a password or biometric authentication.

In accordance with an exemplary embodiment, data is accessible from Recovery App 141 even without successful credential entry on device 101. In the exemplary embodiment depicted in FIG. 2, a Forensic Analyst 109 powers up 201 Electronic device 101, preferably by initiating a low level boot loader program within Electronic Device 101. In accordance with this exemplary embodiment, in response to Power Up Message 201, Electronic Device 101 mounts the decrypted file system with Electronic Device 101 and starts application components that run before the user provided credentials to unlock the device, such as a password or the like. One app that gets started in this exemplary embodiment is Recovery App 141 within Electronic Device 101.

Electronic Device 101 receives (203) a command that causes Recovery App 141 to begin data recovery mode. In accordance with an exemplary embodiment, the command to begin data recovery mode is received before screen unlock is required, for example utilizing the Direct Boot feature for devices running the Android operating system.

Electronic Device 101 receives (209) a data recovery request. The data recovery request preferably includes the identity token received from Identity Provider 105. The identity token is preferably a one-time-use token. The identity token can be received via a USB port on device 101, via a Near Field Communication (NFC) link, via a Bluetooth link, via a camera in device 101, or by any other suitable means.

Recovery App 141 retrieves (211) data from data storage 131. In according with an exemplary embodiment, the data retrieved are digital files. For example, the data files could be a digital photographs or videos that are evidence in a criminal investigation.

Recovery App 141 uploads (213) the retrieved data to Service 103. In accordance with an exemplary embodiment, Recovery App 141 also sends the identity token when uploading the data to service 103, such as a microservice such as the CommandCentral Vault microservice. In an exemplary embodiment, the data that is uploaded is encrypted data.

An exemplary embodiment thereby provides a recovery app that can access files on an electronic device without knowing the password or other access criteria. The recovery app is thereby able to access and transmit digital files on an otherwise inaccessible electronic device while the device is in a locked state and cannot be unlocked.

An exemplary embodiment preserves confidentiality in certain embodiments. For example, the recovery app can access and transmit encrypted files to an external service that has the key to decrypt the files. In this example, the files can be decrypted by an app in the unlocked device, and the external service, but not by the recovery app, since in this example the recovery app does not have a copy of the key for the files.

The recovery app preferably has access to files placed into an open-access/public folder. In this manner, personal data is not placed into the open access folder and preferably cannot be accessed by the recovery app.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for recovering a digital file from a screen-locked device comprising:
    receiving an identity token at a recovery app on the screen-locked device wherein the identity token comprises an attribute that distinguishes the identity token as a forensics identity token;
    retrieving a digital file from the screen-locked device at the recovery app; and
    sending the digital file and the identity token from the recovery app to a service external to the screen-locked device.

2. The method of claim 1, wherein the service is a microservice running in infrastructure equipment coupled with the screen-locked device.

3. The method of claim 1, wherein the service is a service running on a local host.

4. The method of claim 1, wherein digital files uploaded with the forensics identity token are labeled by the service as being uploaded during a forensics procedure rather than a normal upload procedure.

5. The method of claim 1, wherein the digital file is an encrypted digital file.

6. The method of claim 5, wherein a key needed to decrypt the encrypted digital file is managed by the service.

7. The method of claim 6, wherein the key is not accessible by the recovery app.

8. The method of claim 1, wherein the step of retrieving the digital file from the screen-locked device comprises retrieving the digital file from encrypted storage on the screen-locked device.

9. The method of claim 1, the method further comprising assigning an attribute to the digital file, wherein the attribute indicates that the digital file is accessible by the recovery app.

10. The method of claim 1, the method further comprising the step of executing the recovery app when the screen-locked device is rebooted.

11. The method of claim 10, wherein the step of executing the recovery app when the screen-locked device is rebooted comprises executing the recovery app when the screen-locked device is rebooted without the need for the screen-locked device to be unlocked.

12. The method of claim 1, wherein the step of retrieving a digital file from the screen-locked device comprises retrieving a digital file from a public folder on the screen-locked device.

13. The method of claim 1, wherein the screen-locked device remains locked.

14. The method of claim 1, wherein the step of receiving an identity token at a recovery app on the screen-locked device comprises receiving an identity token via a USB (Universal Serial Bus) port on the screen-locked device.

15. The method of claim 1, wherein the step of receiving an identity token at a recovery app on the screen-locked device comprises receiving an identity token utilizing a near field communication (NFC) communication protocol.

16. The method of claim 1, wherein the step of receiving an identity token at a recovery app on the screen-locked device comprises receiving an identity token via Bluetooth.

17. The method of claim 1, wherein the step of receiving an identity token at a recovery app on the screen-locked device comprises receiving an identity token via a camera on the screen-locked device.

18. The method of claim 1, wherein the identity token is a one-time use token.

* * * * *